(12) United States Patent
Lewis et al.

(10) Patent No.: US 10,874,240 B2
(45) Date of Patent: Dec. 29, 2020

(54) LANDING PAD RECEPTACLE FOR PACKAGE DELIVERY AND RECEIPT

(71) Applicant: Walmart Apollo, LLC, Bentonville, AR (US)

(72) Inventors: Steven Lewis, Bentonville, AR (US); Matthew Dwain Biermann, Fayetteville, AR (US); Kevin Matthew Charles, Bentonville, AR (US)

(73) Assignee: WALMART APOLLO, LLC, Bentonville, AR (US)

( * ) Notice: Subject to any disclaimer, the term of this patent is extended or adjusted under 35 U.S.C. 154(b) by 117 days.

(21) Appl. No.: 15/712,510

(22) Filed: Sep. 22, 2017

(65) Prior Publication Data

US 2018/0092484 A1    Apr. 5, 2018

Related U.S. Application Data

(60) Provisional application No. 62/403,908, filed on Oct. 4, 2016.

(51) Int. Cl.
*A47G 29/14* (2006.01)
*G08G 5/00* (2006.01)
(Continued)

(52) U.S. Cl.
CPC .......... *A47G 29/141* (2013.01); *A47G 29/20* (2013.01); *B64C 39/024* (2013.01); *B64D 1/12* (2013.01);
(Continued)

(58) Field of Classification Search
CPC .. A47G 29/141; A47G 29/20; A47G 29/1214; A47G 29/16; A47G 2029/145; A47G 2029/147–149; A47G 2029/1228; A47G 2200/223; B64C 39/024; B64C 2201/128; B64D 1/12; G06Q 10/083; G06Q 10/0832; G06Q 50/28; G08G 5/0069; G08G 5/0026; G08G 5/025; B64F 1/32; G07C 9/00896
USPC ....... 232/17, 19, 45, 34–36; 340/568.1, 569, 340/5.73; 70/63, 158; 200/61.63; 244/114 R
See application file for complete search history.

(56) References Cited

U.S. PATENT DOCUMENTS

| | | |
|---|---|---|
| 1,314,878 A | 9/1919 | Lewinson |
| 5,212,649 A | 5/1993 | Pelletier et al. |

(Continued)

FOREIGN PATENT DOCUMENTS

| | | |
|---|---|---|
| CA | 2944814 A1 | 10/2015 |
| WO | 2015160672 A1 | 10/2015 |

OTHER PUBLICATIONS

Final Office Action in U.S. Appl. No. 15/360,091 dated Mar. 19, 2019; 25 pages.

(Continued)

*Primary Examiner* — William L Miller
(74) *Attorney, Agent, or Firm* — Schmeiser, Olsen & Watts LLP; Timothy P. Collins (57) ABSTRACT

A landing pad receptacle receives and stores a package delivered by an unmanned vehicle, comprising: a housing; a storage compartment in the housing; and a validation device that detects a presence of a package delivered by a unmanned vehicle in the storage compartment and authenticates a package for return by a unmanned vehicle.

18 Claims, 6 Drawing Sheets

(51) Int. Cl.
*G08G 5/02* (2006.01)
*A47G 29/20* (2006.01)
*B64C 39/02* (2006.01)
*B64D 1/12* (2006.01)
*G06Q 10/08* (2012.01)

(52) U.S. Cl.
CPC ......... *G06Q 10/083* (2013.01); *G08G 5/0026* (2013.01); *G08G 5/0069* (2013.01); *G08G 5/025* (2013.01); *A47G 2029/145* (2013.01); *A47G 2029/147* (2013.01); *A47G 2200/223* (2013.01); *B64C 2201/128* (2013.01)

(56) References Cited

U.S. PATENT DOCUMENTS

| | | | |
|---|---|---|---|
| 5,385,265 | A | 1/1995 | Schlamp |
| 6,215,397 | B1 | 4/2001 | Lingskog |
| 6,690,997 | B2 | 2/2004 | Rivalto |
| 7,086,198 | B2 | 8/2006 | Hayden |
| 7,857,161 | B2 | 12/2010 | Pinney et al. |
| 7,925,375 | B2 | 4/2011 | Schininger et al. |
| 8,145,351 | B2 | 3/2012 | Schininger et al. |
| 9,135,403 | B1 | 9/2015 | Tolmosoff |
| 9,211,025 | B1 | 12/2015 | Elhawwashy |
| 9,244,147 | B1* | 1/2016 | Soundararajan .......... G01S 1/44 |
| 9,387,928 | B1 | 7/2016 | Gentry et al. |
| 9,436,923 | B1 | 9/2016 | Sriram et al. |
| 9,513,627 | B1 | 12/2016 | Elazary et al. |
| 9,545,995 | B1 | 1/2017 | Chau et al. |
| 9,550,577 | B1 | 1/2017 | Beckman et al. |
| 9,573,684 | B2 | 2/2017 | Kimchi et al. |
| 9,635,000 | B1 | 4/2017 | Muftic |
| 9,741,255 | B1 | 8/2017 | Navot et al. |
| 9,743,272 | B1 | 8/2017 | Ogrinz et al. |
| 9,783,297 | B2 | 10/2017 | Patrick et al. |
| 9,842,120 | B1 | 12/2017 | Siris et al. |
| 9,875,592 | B1 | 1/2018 | Erickson et al. |
| 9,926,078 | B2* | 3/2018 | Bonazzoli ............. B64C 39/024 |
| 10,022,614 | B1 | 7/2018 | Tran et al. |
| 10,026,054 | B1* | 7/2018 | Staton ................ G06Q 10/0832 |
| 10,028,606 | B1* | 7/2018 | Ritchie .................. A47G 29/12 |
| 10,039,113 | B2 | 7/2018 | Ogrinz |
| 10,068,228 | B1 | 9/2018 | Winklevoss et al. |
| 10,103,936 | B2 | 10/2018 | Kurian et al. |
| 10,158,480 | B1 | 12/2018 | Winklevoss et al. |
| 10,243,964 | B2 | 3/2019 | Kraemer et al. |
| 10,333,706 | B2 | 6/2019 | Smith et al. |
| 10,351,261 | B1* | 7/2019 | Bryant ................. A47G 29/141 |
| 2001/0034665 | A1 | 10/2001 | Kinory et al. |
| 2002/0035515 | A1 | 3/2002 | Moreno |
| 2006/0145837 | A1 | 7/2006 | Horton et al. |
| 2008/0078707 | A1 | 4/2008 | Wattawa |
| 2011/0238300 | A1 | 9/2011 | Schenken |
| 2012/0143482 | A1 | 6/2012 | Goossen et al. |
| 2012/0246039 | A1 | 9/2012 | Fain et al. |
| 2012/0253548 | A1 | 10/2012 | Davidson |
| 2012/0254058 | A1 | 10/2012 | Walker et al. |
| 2013/0103606 | A1 | 4/2013 | Holliday |
| 2013/0240673 | A1 | 9/2013 | Schlosser et al. |
| 2014/0014008 | A1 | 1/2014 | Tompkins |
| 2014/0032034 | A1 | 1/2014 | Raptopoulos et al. |
| 2014/0254896 | A1 | 9/2014 | Zhou et al. |
| 2015/0006005 | A1 | 1/2015 | Yu et al. |
| 2015/0106294 | A1 | 4/2015 | Robinson et al. |
| 2015/0120094 | A1 | 4/2015 | Kimchi et al. |
| 2015/0142692 | A1 | 5/2015 | Gillen et al. |
| 2015/0158599 | A1 | 6/2015 | Sisko |
| 2015/0175276 | A1 | 6/2015 | Koster |
| 2015/0183528 | A1 | 7/2015 | Walsh et al. |
| 2015/0277440 | A1 | 10/2015 | Kimchi et al. |
| 2015/0294262 | A1 | 10/2015 | Nelson et al. |
| 2015/0317596 | A1* | 11/2015 | Hejazi ................... G06Q 50/28 705/330 |
| 2015/0323930 | A1 | 11/2015 | Downey et al. |
| 2015/0332206 | A1 | 11/2015 | Trew et al. |
| 2015/0332283 | A1 | 11/2015 | Witchey |
| 2016/0033966 | A1 | 2/2016 | Farris et al. |
| 2016/0098730 | A1 | 4/2016 | Feeney |
| 2016/0117934 | A1 | 4/2016 | Soundararajan et al. |
| 2016/0180719 | A1 | 6/2016 | Wouhaybi et al. |
| 2016/0185466 | A1 | 6/2016 | Dreano, Jr. |
| 2016/0195602 | A1 | 7/2016 | Meadow |
| 2016/0196755 | A1 | 7/2016 | Navot et al. |
| 2016/0235236 | A1* | 8/2016 | Byers ................... A47G 29/14 |
| 2016/0253907 | A1 | 9/2016 | Taveira |
| 2016/0257401 | A1 | 9/2016 | Buchmueller et al. |
| 2016/0267558 | A1 | 9/2016 | Bonnell et al. |
| 2016/0300187 | A1 | 10/2016 | Kashi et al. |
| 2016/0307449 | A1 | 10/2016 | Gordon et al. |
| 2016/0316322 | A1 | 10/2016 | Gillen |
| 2016/0358432 | A1 | 12/2016 | Branscomb et al. |
| 2016/0359986 | A1 | 12/2016 | Jones |
| 2016/0376031 | A1 | 12/2016 | Michalski et al. |
| 2017/0011333 | A1 | 1/2017 | Greiner et al. |
| 2017/0015415 | A1 | 1/2017 | Chan et al. |
| 2017/0045894 | A1 | 2/2017 | Canoy et al. |
| 2017/0073085 | A1* | 3/2017 | Tremblay ................ B64F 1/362 |
| 2017/0083860 | A1 | 3/2017 | Sriram et al. |
| 2017/0083862 | A1 | 3/2017 | Loubriel |
| 2017/0090484 | A1 | 3/2017 | Obaidi |
| 2017/0091710 | A1* | 3/2017 | Van Dyke .............. G05D 1/101 |
| 2017/0110017 | A1 | 4/2017 | Kimchi et al. |
| 2017/0115976 | A1 | 4/2017 | Mills |
| 2017/0132393 | A1 | 5/2017 | Natarajan et al. |
| 2017/0147808 | A1 | 5/2017 | Kravitz |
| 2017/0147975 | A1* | 5/2017 | Natarajan ............. B64C 39/024 |
| 2017/0148328 | A1 | 5/2017 | Chan et al. |
| 2017/0149795 | A1 | 5/2017 | Day, II |
| 2017/0255896 | A1* | 9/2017 | Van Dyke ............ A47G 29/141 |
| 2017/0300905 | A1 | 10/2017 | Withrow et al. |
| 2017/0310747 | A1 | 10/2017 | Cohn et al. |
| 2017/0328391 | A1 | 11/2017 | Matsuda |
| 2017/0349376 | A1 | 12/2017 | Porat |
| 2017/0372391 | A1 | 12/2017 | Metnick et al. |
| 2018/0049575 | A1* | 2/2018 | Yamrick ................ A47G 29/28 |
| 2018/0053161 | A1 | 2/2018 | Bordash et al. |
| 2018/0109767 | A1 | 4/2018 | Li et al. |
| 2018/0117447 | A1 | 5/2018 | Tran et al. |
| 2018/0130159 | A1 | 5/2018 | High et al. |
| 2018/0137306 | A1 | 5/2018 | Brady et al. |
| 2018/0137461 | A1 | 5/2018 | Wilkinson et al. |
| 2018/0137465 | A1 | 5/2018 | Batra et al. |
| 2018/0141453 | A1 | 5/2018 | High et al. |
| 2018/0155011 | A1* | 6/2018 | Greiner ................... B64D 1/22 |
| 2018/0239343 | A1 | 8/2018 | Voorhies et al. |
| 2018/0252533 | A1 | 9/2018 | Jantunen et al. |
| 2018/0253092 | A1 | 9/2018 | Trapero Esteban et al. |
| 2018/0265194 | A1 | 9/2018 | Gauglitz |
| 2018/0268386 | A1 | 9/2018 | Wack et al. |
| 2018/0268719 | A1 | 9/2018 | Guan et al. |
| 2018/0270611 | A1 | 9/2018 | Jones |
| 2018/0275654 | A1 | 9/2018 | Merz et al. |
| 2018/0300679 | A1 | 10/2018 | Mahmood |
| 2019/0066047 | A1* | 2/2019 | O'Brien ............. G06Q 10/0838 |

OTHER PUBLICATIONS

International Preliminary Report on Patentability in PCT/US2017/052906 dated Apr. 18, 2019; 10 pages.
Ó Cionnaith, Fiachra, "CIT student James hopes blood delivery drones take off," IrishExaminer.com, Jun. 10, 2014; 12 pages.
"The Whole Done Package System Concept," Cstwiki.wtb.tue.nl, last modified Oct. 21, 2014, accessed Sep. 11, 2015; 5 pages.
Gye, Hugo, "Now that's a special delivery: Domino's builds Drone to deliver pizzas by air and beat traffic," DailyMail.co.uk, Jun. 5, 2013; 7 pages.
Phillips, Alan, "Your Drone Mailbox is Coming," DroneLife.com, May 28, 2014; 3 pages.
Chu, Jennifer, "Delivery by Drone," Lids.MIT.edu/news-and-events, Aug. 21, 2014; 3 pages.
Lavars, Nick "Drone delivery nets could be the mailboxes of the future," GizMag.com, Nov. 17, 2014; 30 pages.

(56) References Cited

OTHER PUBLICATIONS

"DRU—Domino's Robotic Unit," Dominos.co.nz, accessed Jul. 28, 2016; 5 pages.

International Search Report & Written Opinion in International Patent Application No. PCT/US16/63520, dated Feb. 9, 2017; 8 pages.

Non-Final Office Action in U.S. Appl. No. 15/360,091 dated Oct. 2, 2018; 22 pages.

International Search Report & Written Opinion in International Patent Application No. PCT/US17/52906, dated Dec. 12, 2017; 11 pages.

International Preliminary Report on Patentability in PCT/US16/63520 dated Jun. 7, 2018; 8 pages.

Notice of Allowance in U.S. Appl. No. 15/360,091 dated Oct. 2, 2019; 25 pages.

Redman, Jamie "Chronicled Demos Blockchain-Connected Delivery Drone," Oct. 18, 2016, Bitcoin.com.

Chantz, Hy "Using Blockchain to Address Drone Cybersecurity," Aug. 25, 2016, SecurityIntelligence.com.

\* cited by examiner

FIG. 5

LANDING PAD RECEPTACLE FOR PACKAGE DELIVERY AND RECEIPT

RELATED APPLICATIONS

This application claims the benefit of U.S. Provisional Patent Application No. 62/403,908, filed Oct. 4, 2016, entitled "Landing Pad Receptacle for Package Delivery and Receipt," the contents of which are incorporated by reference herein in their entirety.

TECHNICAL FIELD

The present inventive concepts relate to unmanned aerial vehicles (UAVs) or other robotic apparatus that transport packages containing consumer goods, and more specifically, to temporary storage facilities from where goods may be retrieved by a UAV and/or to where goods may be delivered by a UAV.

BACKGROUND

Unmanned aerial vehicles (UAVs), often referred to as drones, have been considered as a source of delivery of packages to consumers. One challenge to providing a drone delivery service is the need for an infrastructure for receiving a delivery of packages from a UAV in a safe and secure manner. Another challenge is the authentication of a package that is retrieved by a UAV from a location for delivery to another location, for example, a package including goods for return to a store.

SUMMARY

In one aspect, provided is a landing pad receptacle that receives and stores a package delivered by an unmanned vehicle comprising: a housing; a storage compartment in the housing; and a validation device that detects a presence of a package delivered by an unmanned vehicle in the storage compartment and authenticates a package for return by an unmanned vehicle.

The unmanned vehicle may be an unmanned aerial vehicle (UAV).

The housing may include a theft-deterrent mesh material.

The validation device may include a weight sensor comprising: a platform on which the package is positioned; and a spring or hydraulic mechanism under the platform that detects a force applied to the platform. The force may include the weight of the package.

The landing pad receptacle may further comprise a cover at an opening to the housing. The cover may automatically cover the opening to the housing when the weight sensor detects the weight of the package positioned on the platform of the weight sensor.

The cover may include a hinged lid or a slideable security gate.

The landing pad receptacle may further comprise a lock that automatically secures the package in the storage compartment in response to the validation device detecting the presence of the package.

The landing pad receptacle may further comprise a plurality of light emitting diodes or fluorescent rim about the periphery of an opening to the housing for identifying the opening or for notifying a viewer of the presence of the package in the storage department.

The landing pad receptacle may further comprise an on-board wireless interface for communicating with the unmanned vehicle.

The landing pad receptacle may further comprise an on-board navigation system for directing the unmanned vehicle to the landing pad. The navigation system may include a spatial or obstruction sensor or related object recognition device to guide the unmanned vehicle to the landing pad away from dangerous objects about the landing pad.

The landing pad receptacle may further comprise an alarm device for generating an alarm when an object is near the landing pad when the compartment includes the package.

The landing pad receptacle may further an Internet of Things (IoT) device.

The IoT device may comprise a temperature controller for determining a temperature of the storage compartment.

The storage compartment may comprise a first compartment that is temperature controlled at cold temperatures, and a second compartment that is temperature controlled at hot temperatures.

The temperature controller may generate temperature information on a regular basis to an electronic device in possession by a user.

The storage compartment may be configured for receiving at least removable modular unit for accommodating a particular package.

The storage compartment may include a plurality of regions, each configured for being assigned and receiving a different package.

The landing pad receptacle may further comprise an extension coupling for receiving a fixture mounted to the landing pad.

The landing pad receptacle may further comprise a validation device for confirming the authenticity of the package for return by the unmanned vehicle.

The storage compartment may include an ultrasound device that is detected from the unmanned vehicle.

In another aspect, provided is a system for package delivery and receipt, comprising: a landing pad receptacle that receives and stores a package delivered by an unmanned vehicle; and a navigation system for directing the unmanned vehicle to the landing pad receptacle.

In some embodiments, the landing pad receptacle comprises a storage compartment; and a validation device that detects a presence of a package delivered by the unmanned vehicle in the storage compartment and authenticates a package for return by the unmanned vehicle.

In another aspect, provided is a method for operation of a landing pad repository, comprising: detecting by the landing pad repository an approach by the unmanned vehicle, the unmanned vehicle either carrying a package for delivery or for retrieving a package from the landing pad repository, wherein detecting the approach of the unmanned vehicle includes performing object recognition to confirm that the approach is safe; providing access to a storage compartment of the landing pad repository for the depositing of the package or retrieval of the package; and detecting a presence of the package in the storage compartment.

The method may further comprise inspecting and validating the package for return of the package by the unmanned vehicle to a different location.

DETAILED DESCRIPTION OF EMBODIMENTS OF THE INVENTION

Figure 1:
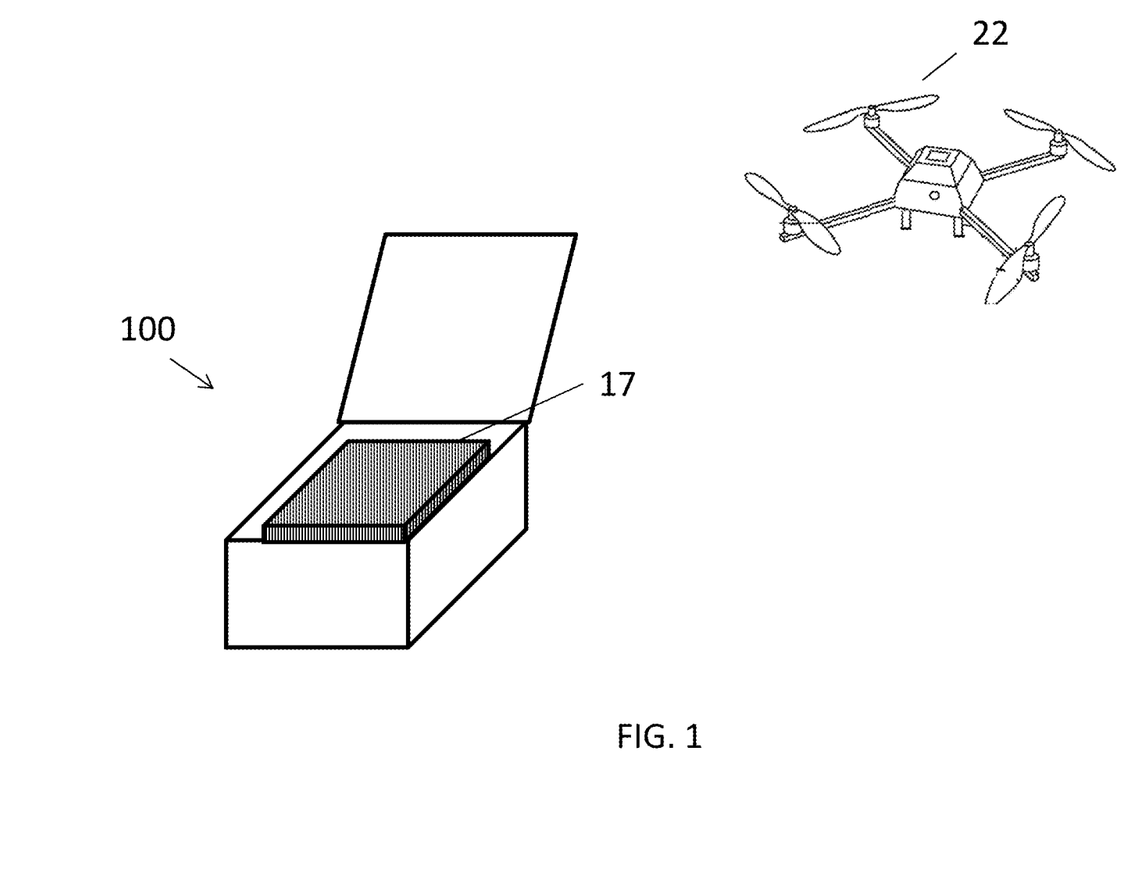
FIG. 1 depicts an environment at which a drone delivers a package to a landing pad receptacle or retrieves a package stored at the landing pad receptacle, in accordance with some embodiments.

FIG. 1 depicts an environment in which a UAV 22, e.g., a drone or the like, may deliver a package 17 to a landing pad receptacle 100 and/or retrieve a package 17 stored at a landing pad receptacle 100, in accordance with some embodiments. Although a UAV is referred to herein, other unmanned vehicles may equally apply such as unmanned ground vehicles or other robotic apparatus capable of transporting store merchandise.

The landing pad receptacle 100 serves as a repository for items ordered by a customer, for example, items ordered from an e-commerce website, phone order, or other communication, and delivered to a location of preference to the customer, for example, the customer's home or business. In particular, the landing pad receptacle permits fresh foods or other perishables to be visually selected by a store associate at the time of order fulfillment, and maintain their freshness after delivery to the customer. The selected items permit customers to choose perishables of interest without the fear of spoilage or damage. For example, a user may use a mobile device application or a website to order an item. Instead of going to the store to retrieve the ordered item, the user may go to the location of the landing pad repository to retrieve the item. With regard to perishable items, a store associate will select the best lettuce on behalf of the customer based on what is available at that store at that time. The landing pad repository 100 and/or UAV 22 may include sensors or the like to visually inspect the item to confirm the customer's order and to determine that the item satisfies the customer's requirements.

The landing pad receptacle 100 may be mounted on a retractable pole or other object to reduce exposure of its contents to damage if positioned on the ground. The pole may include mechanical elements that communicate with a remote controller, which may be operated by a user to advance or retract the pole, for example, to retrieve a package 17 from the landing pad receptacle 100 or to place a package in the receptacle 100 for receipt by a UAV 22. In other examples, the landing pad receptacle 100 can be positioned on a roof, window, or other high location of a building. In some embodiments, the landing pad receptacle 100 comprises an extension coupling for receiving a fixture mounted to the landing pad housing. In other examples, the landing pad receptacle 100 may be mounted in an elevator extending from a roof to another part of the building, for example, a kitchen. In this example, a UAV 22 may deliver the package 17 to the landing pad receptacle 100 when the elevator is at the roof. A user can provide a request, for example, from a computer to the landing pad receptacle 100 or an elevator, carrier, or other apparatus transporting the receptacle 100 to other locations, to a location of interest such as a kitchen. In other examples, the landing pad receptacle 100 can be placed on a moving vehicle or other apparatus. Even though the landing pad receptacle 100 may be mobile, the UAV 22 can nevertheless locate the receptacle 100 for delivery via GPS and/or other wireless location detection technology.

In some embodiments, an identification, authentication, or related security technique is performed between the UAV 22 and the landing pad receptacle 100 to determine whether it is acceptable for the UAV 22 to position the package 17 in the landing pad receptacle 100 and/or to retrieve the package 17 from the landing pad receptacle 100. For example, before a package 17 is delivered, the landing pad receptacle 100 may include a transmitter 212 that transmits a signal to the UAV 22 that includes a unique identification, location information, and so on. The UAV 22 and receptacle 100 may exchange credentials as part of a security technique. A navigation technique may be performed between the UAV 22 and the landing pad receptacle 100 to ensure that the package 17 is properly delivered by the UAV 22 to the landing pad receptacle 100.

Navigation and/or security techniques may be initiated after the UAV 22 is detected within a predetermined distance from the landing pad receptacle 100, or may be predetermined prior to the UAV 22 beginning its delivery, for example, for a location where the package 17 is received by the UAV 22 for delivery. To perform a security operation, a digital data exchange may be required between the receptacle 100, the UAV 22, and/or other remote apparatus, for example, an encryption/decryption machine. Therefore, each of the UAV 22 and landing pad receptacle 100 may include both transmitting and receiving devices for exchanging security information. In some embodiments, the landing pad receptacle 100 includes a coded identification, for example, a radio frequency identification (RFID) tag that is scanned by the UAV 22 to confirm a delivery or retrieval location. Using this information, the UAV 22 can complete a delivery or retrieval process.

The exchange of data between the UAV 22 and landing pad receptacle 100 may be made via electronic transmission, for example, GPS, RFID, optical locating, WiFi, ultrasound identification, ultrasound ranging, line of sight (LoS), radio beacon, visual, or a combination thereof. In some embodiments, ultrasound is preferred over radio frequency due to its properties and features.

The landing pad receptacle 100 may identify its unique location via global positioning satellite (GPS), Bluetooth™, or electronic transmission to the delivery drone and facilitating the sending or receiving of matching delivery information to verify and process the delivery. An onboard GPS device or the like may provide exact coordinates and orientation information to the UAV 22 as it approaches, and to guide the UAV 22 to the landing pad repository 100. LED lighting may be used for the UAV 22 in additional guiding, for example, for centering the UAV 22 at the opening of the landing pad repository 100 from where items of interest may be delivered and/or retrieved. The receptacle navigation system may include a spatial or obstruction sensor or related object recognition device to guide the UAV to the landing pad away from dangerous objects that may be near or at the landing pad receptacle 100.

The landing pad receptacle 100 may include an alarm device for generating an alarm when an undesirable object, for example, an animal, is near or at the landing pad when the compartment 203 includes the package 17.

After authentication, the UAV 22 may insert the package 17 in the landing pad receptacle 100 when delivering the package 17, or remove the package 17 from the landing pad receptacle 100 when retrieving the package 17.

Figure 2A:
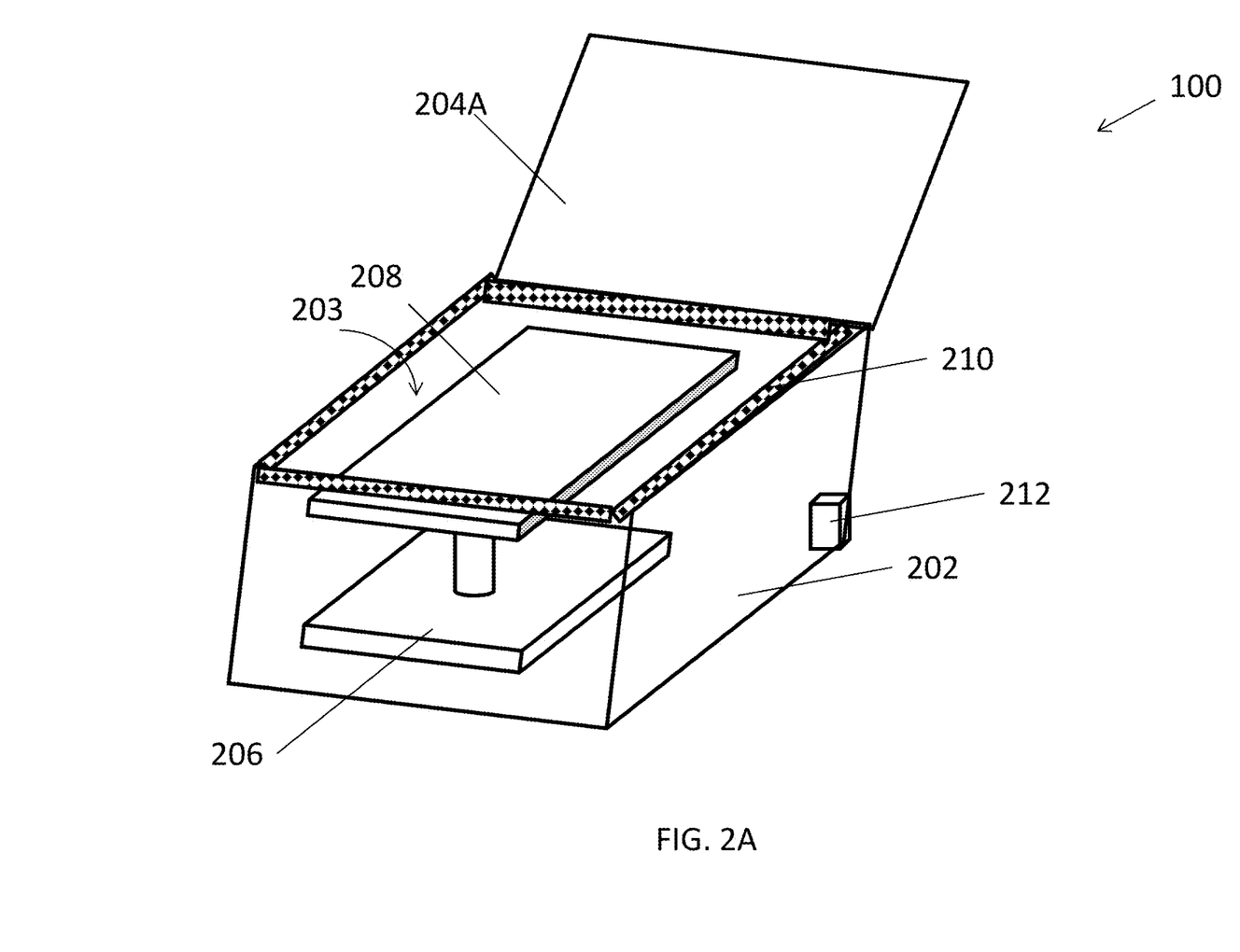
FIGS. 2A and 2B are perspective views of a landing pad receptacle, in accordance with some embodiments.
Figure 2B:
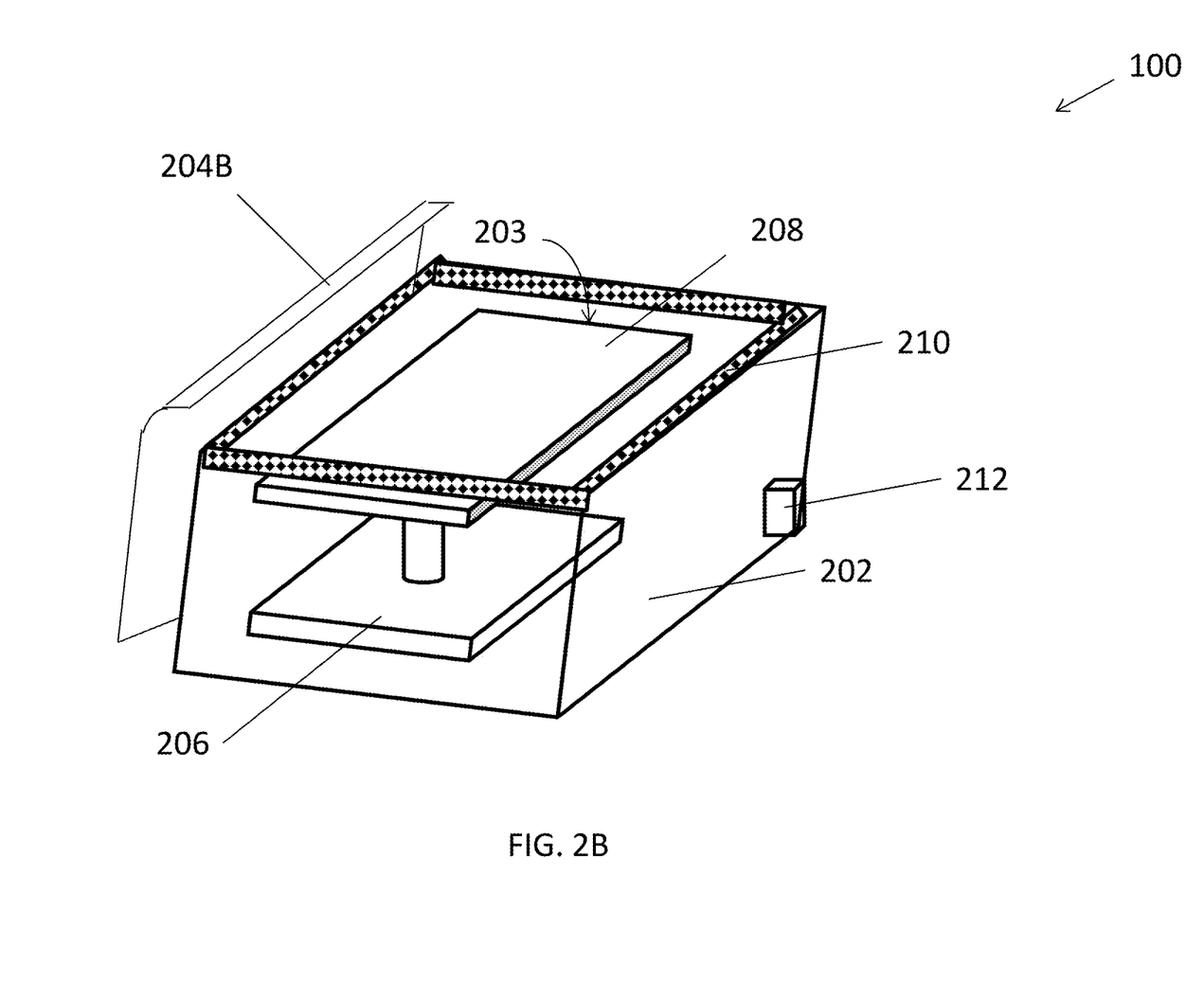

To achieve the foregoing, as shown in FIG. 2, the landing pad receptacle 100 includes but is not limited to a housing 202, one or more storage compartments 203, and/or sub-compartments, in the housing 202, and a cover 204. The exterior surface of the landing pad receptacle, namely, housing 202, storage compartment 203, and/or cover 204 may be covered with a skin, graphic, or other user-defined exterior covering. For example, a user may desire that the receptacle 100 be covered in camouflage. A receptacle owner, such as a store, delivery service, or other business, may wish to display an advertisement on the receptacle 100.

In some embodiments, the housing 202 includes a lightweight mesh or fencing material that may serve as a theft-deterrent, and provides a barrier between the items in the housing 202 and external threats such as animals, thieves, and so on.

The cover 204, also referred to as a door, trap door, mesh fencing, or lid, is at an opening to the storage compartment 203. The cover 204 may automatically cover the opening to the storage compartment 203 when the presence of the package 17 is detected, for example, when a weight sensor or other validation device 206 detects the presence of the package 17 and confirms a delivery of the package 17 or a removal of the package 17 from the storage compartment 203. Thus, the validation device 206 can confirm package delivery and activate the cover to close over the package 17 once it has been delivered, to prevent tampering or theft. The validation device 206 may have other functions. For example, the validation device may sense when the package 17 is in the compartment 203, and in response trigger or activate an alarm sensor to detect objects such as animals at or near the receptacle 100. When an animal is detected, then an alarm may be generated. In another example, the receptacle 100 may be empty, but opened, and the sensor upon detecting an animal may cause the cover 204 to automatically close to prevent the animal from entering the compartment 203.

During a package retrieval operation, the package 17 is removed from the weight sensor, after which the cover 204 shuts and may be locked. In some embodiments, the landing pad receptacle 100 is notified by the UAV 22 that it is approaching with the package 17, whereby the receptacle 100 opens the cover 204 to expose the storage compartment 203 for depositing by the UAV 22. Therefore, the cover 204 may automatically expose the storage compartment 203 when the UAV 22 approaches the landing pad receptacle 100, for example, to retrieve the package 17 in the storage compartment 203. In some embodiments, as shown in FIG. 2A, the cover 204 includes a hinged lid 204A. In other embodiments, as shown in FIG. 2B, the cover 204 includes a slideable security gate 204B, or mesh, fence, or the like. In some embodiments, each sub-compartment may include its own cover.

The landing pad receptacle 100 may include a lock (not shown) that automatically secures the cover 204 to the housing 202 and covers the package 17 in the storage compartment 203 in response to a sensing, for example, by a weight sensor, of the presence of the package 17. In embodiments where each sub-compartment has its own cover, a sub-compartment may be secured in a different manner than other sub-compartments. For example, a particular security mechanism may require an electronic signature for one sub-compartment, while another sub-compartment may require no lock and simply open and close without locking.

A weight sensor as shown in FIG. 1 may be one type of validation device 206, but not limited thereto. The validation device 206 may include other sensors or the like. Other devices may equally apply for detecting the presence of a package delivered by a UAV 22 in the storage compartment 203 and/or authenticating a package for return by a UAV 22, which is different than the authentication of a UAV 22.

In embodiments where the validation device 206 includes a weight sensor, the weight sensor may comprise a platform on which the package is positioned and a spring or hydraulic mechanism under the platform that acts when a force such as a weight is applied to the platform. The weight sensor includes a special purpose device that receives a signal that includes the weight of the item, which can be processed, stored, analyzed, and/or otherwise used by another electronic device. A sensed weight may be recorded, for example, stored in a data memory and output for analysis or validation. For example, the weight sensor may sense a weight of a package 17, for example, up to 5 lbs. or other weight limit determined that allows the landing pad receptacle 100 to temporarily receive and store the package 17. In some embodiments, the weight sensor may send a signal to the transmitter 212 to send an alert to a delivery service or the like to arrive at the location of the landing pad repository 100 to retrieve the delivered package 17, for example, and bring it to its final destination. The repository 100 may include a barcode scanner or the like for authenticating or confirming the package 17 prior to retrieval from the repository 100.

In response to a confirmation of delivery of the package 17, for example, by a weight-sensing landing pad of the validation device 206, the cover 204 may be positioned over the package 17 in the housing 202 to prevent tampering or theft.

During a delivery operation, the package 17 is placed on top of the weight sensor the weight spring under the weight platform may be reduced in height inside the housing 202, causing the package 17 to be lowered and permitting the cover 204 to fit over it. The receptacle 100 may include a mechanical, hydraulic, and/or electrical system that instructs the cover 204 to close upon a weight sensed by the validation device 206. A locking mechanism may be implemented for securing the cover 204 against the housing 202. The storage door lock may be an electronic lock and/or a mechanical lock.

The validation device may be used for returning a package by the UAV 22 or other unmanned vehicle which removes the package from the repository 100. It is well-known that service provides such as UPS™ and Fedex™ may weigh a package prior to retrieval and delivery. The weight sensor 208 may perform this function. After the package 17 is weighed, an alert can be sent to the delivery service to send the UAV 22 to the landing pad repository 100 to retrieve the package 17. The repository 100 may include a scanning device such as a barcode scanner to collect package data from a QR code or barcode on the package, which may be used for authentication, identification, delivery instructions, and so on.

The receptacle 100 may include a plurality of light emitting diodes (LEDs) 210 or the like that may be illuminated about the opening of the housing 202, which is covered by the cover 204 when in a closed position. The LEDs 210 may illuminate when the receptacle 100 is opened, i.e., cover 204 is removed from the opening to the housing 202, or may be permanently lit, for example, powered by solar devices. Alternative, a fluorescent or banded rim may at least partially surround the region of the landing pad receptacle 100, for example, the cover 204 or opening to the storage compartment 203 where a package 203 may be delivered and/or retrieved. The LEDs 210 or fluorescent band may provide a target for the UAV 22 and be used to guide or orient the UAV 22. The LEDs 210, florescent rim, or the like may be used to signal to the customer that the package 17 has been delivered or removed. The LEDs 210 may change colors, where one color may indicate that the package 17 has been delivered, while another color may indicate that the storage compartment 203 is empty and available to receive the package 17.

An on-board wireless interface 212, for example, a Bluetooth interface, may be used to exchange transactional data with the UAV 22, such as sending a signal that the package 17 has been accepted, signed for, or provide alerts that perhaps the box is damaged or unable to accept packages at this time, or provide instructions to shut off the housing lights 210. Information that may be exchanged may include but not be limited to a package accepted message, package signed-for electronically, i.e., e-signature, alerts, capacity, dimensions, location, orientation, customer identification, and so on. Other wireless technologies in addition to or instead of Bluetooth and GPS may be part of the landing pad receptacle 100 for performing data exchanges with the UAV 22, such as ultra-high frequency, WiFi, LiFi, and so on. The wireless interface 212 may also provide connectivity to a network provider such as an Internet provider.

The landing pad receptacle 100 may include a special purpose computer that stores a user signature for processing an e-signature event with respect to the UAV 22 or other unmanned vehicle, whereby the storage compartment is opened for depositing the package into the storage compartment, for items such as prescription pills, or legal documents that require a signature on receiving.

In embodiments where multiple compartments, modules, or locker components are part of the landing pad repository 100, each compartment or module may have a unique identification that may be used by the UAV 22 to distinguish them from each other. In some embodiments, a window component may be provided instead of a storage compartment, for example, placed on a window sill in space-limited locations. For example, the repository 100 may be positioned at a city apartment. The repository 100 may include an identification tag such as a QR code or the like which includes information about the repository 100. In some embodiments, the cover 204 may be at a side of the housing 202 instead of the top of the housing. This information may be sent to the UAV 22 so that the UAV 22 may provide the ability to push a payload forward into a slider mechanism instead of dropping the package 17 down into the housing opening 203.

Figure 5:
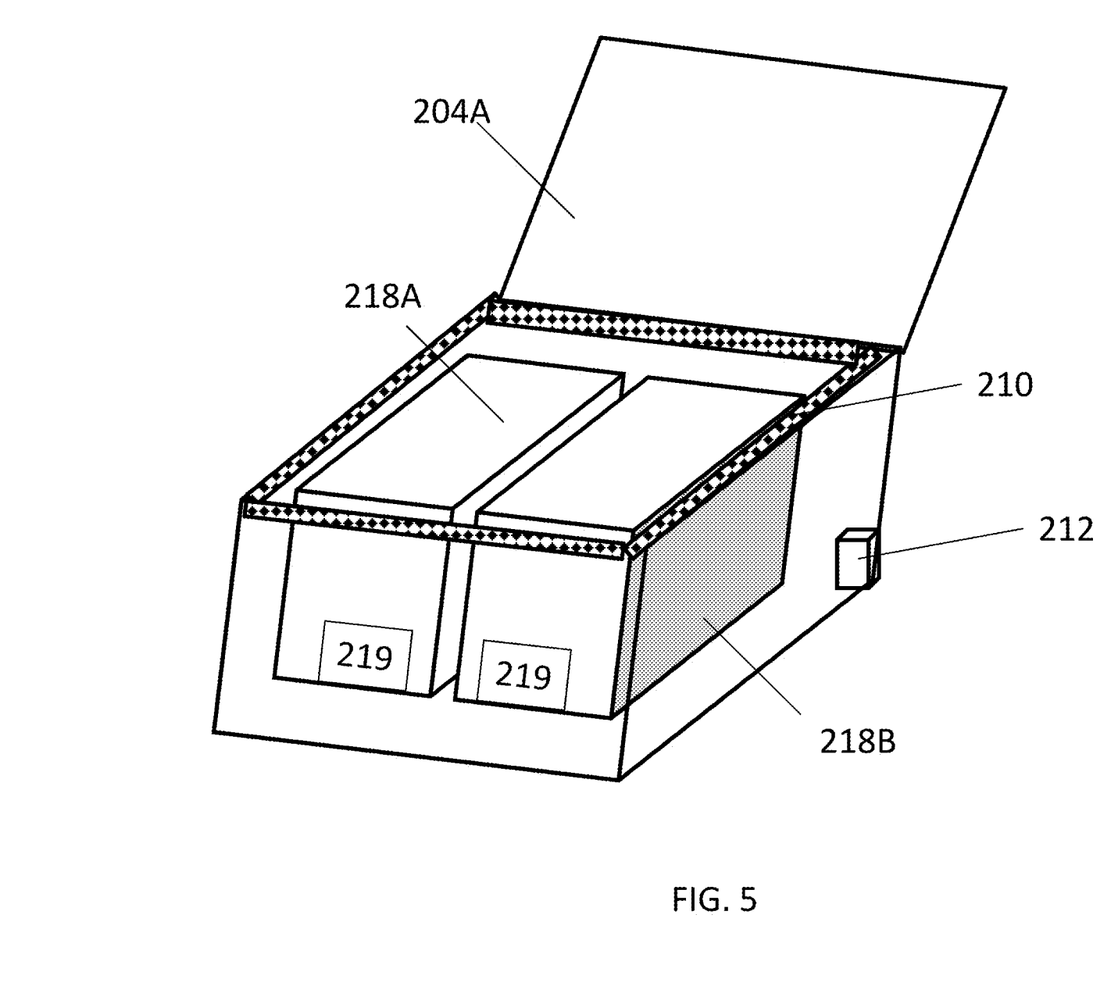
FIG. 5 is a perspective view of a landing pad receptacle, in accordance with some embodiments.

In some embodiments, the storage compartment 203 of the landing pad receptacle 100 may be temperature-controlled, for example, heated or cooled. In some embodiments where the storage compartment 203 includes multiple sections or sub-compartments, for example, as shown in FIG. 5. Here, one or more sub-compartments 218A are maintained at one temperature by a sensor 219, while another sub-compartment 218B is maintained at a different temperature. For example, a UAV 22 may deliver a meal that must be maintained by the temperature sensor 219 at a high temperature after delivery to the receptacle 100. However, a container of ice cream may also be delivered, which must be stored at a cold temperature in a different compartment of the receptacle 100.

In some embodiments, as shown in FIG. 5, the modules, modular units, or sub-compartments 218A, B are replaceable, or swappable. The housing may be configured to receive and hold in place the multiple sub-compartments. The storage compartment may include a plurality of regions, each configured for being assigned and receiving a different package.

For example, a temperature-sensitive sub-compartment may be configured to receive an edible hot-item such as pizza, but be replaced by a different module that includes a refrigerated item such as milk or produce. There may be multiple compartments within a single box to facilitate the use of multiple modules, for example, a hot module, a cold module, and store both types of perishables in the housing at the same time.

In some embodiments, the specialized boxes or modules 218A, B of the storage compartment 203 may include an internet of things (IoT) device or computer interface that allows a user to log in and set the temperature, or to configure the system so that the temperature is adjusted automatically, for example, a temperature controller that changes the temperature to accommodate the package placed in the compartment 203 or sub-compartment in response to temperature readings provided by a temperature, pressure, humidity, and/or other sensor. The temperature controller may generate temperature information on a regular basis to an electronic device in possession by a user, for example, output temperature information regarding the interior of the storage compartment 203 every 5 minutes to a user computer.

In some embodiments, the storage compartment 203, or a sub-compartment of the storage compartment 203, may be hermitically sealed, for example, for certain perishable items.

In some embodiments, the storage compartment 203, or a sub-compartment of the storage compartment 203, may include a unique identification to distinguish a package in the storage compartment or sub-compartment. For example, the package 17 may include a prescription medicine delivered by the UAV 22 from a pharmacy or the like. The storage compartment 203 or sub-compartment may include a unique security lock which requires biometric access, password, or other user authorization so that the compartment 203 or sub-compartment may open only for a recipient for which the prescription is designated. In some embodiments, the landing pad receptacle 100 may comprise a special purpose computer that stores a user signature for processing an e-signature event with respect to the UAV 22. The storage compartment 203 may be opened for depositing the package 17 into the storage compartment 203, for example, for packages including important or sensitive items such as prescription pills or legal documents that require a written or electronic signature upon receipt.

In some embodiments, the landing pad receptacle 100 includes other accessories, including but not limited to a charging port and a connector to a power source for charging the UAV 22. The charger may include an auto-sensing feature for different power supplies and countries. In some embodiments, the landing pad receptacle 100 includes a power measuring device for collecting data regarding charging the UAV 22. The collected data may be used to establish a price, shipping cost, or the like, or to establish a discount or additional cost, for example, a discount for charging the UAV 22. For example, a power measuring device may be provided for collecting data regarding charging the unmanned vehicle, which may be used for determining a kickback or discount for charging the device such as lower price on shipping on current shipment, or discount on the next purchase.

Figure 3:
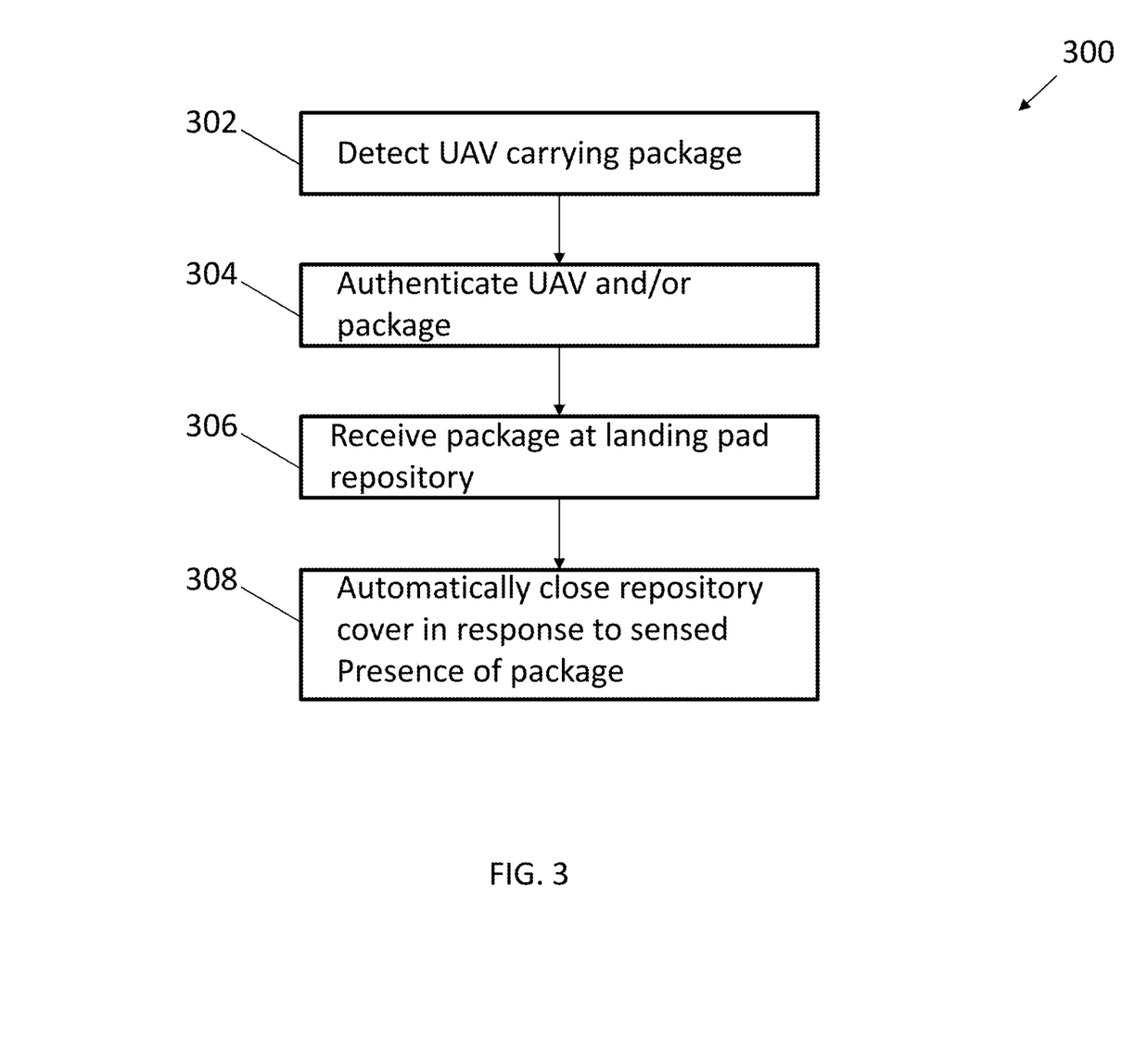
FIG. 3 is a flow diagram illustrating a method for delivering a package to a landing pad receptacle by a UAV, in accordance with some embodiments.

FIG. 3 is a flow diagram illustrating a method 300 for delivering a package to a landing pad receptacle by a UAV, in accordance with some embodiments. The method 300 may be performed by some or all of the elements of the environment illustrated at FIGS. 1 and 2. The method 300 permits a package to be delivered to and/or retrieved from a customer location, for example, a customer's yard. In doing so, the landing pad receptacle 100 is constructed and arranged to prevent or mitigate the risk of theft or damage of contents in the receptacle 100. The landing pad receptacle 100 may be positioned at any location that permits a UAV 22 to approach and deposit or retrieve a package 17 at the landing pad receptacle 100.

At block 302 of method 300, the landing pad receptacle 100 detects the arrival of a UAV 22 carrying a package 22. The receptacle 100 may include on-board navigation system for directing the UAV 22. As a prerequisite to arrival by the UAV 22 at the landing pad receptacle 100, one or more sensors at the receptacle 100 may be activated, for example, in response to a determination of the arrival of the UAV 22. The sensors may identify possible objects, impediments, or the like that pose a danger to an exchange of a package 17 from the arriving UAV 22 and the landing pad receptacle 100.

At block 304, at least one of the UAV 22 and the package 17 is authenticated. For example, the UAV 22 may execute a security technique that includes an exchange credentials with the landing pad receptacle 100.

At block 306, the package is received at the landing pad receptacle 100.

At block 308, the cover 204 is automatically positioned over the opening of the receptacle housing 202, for example, in response to the weight sensor sensing the presence of the package 17 in the storage compartment 203.

Figure 4:
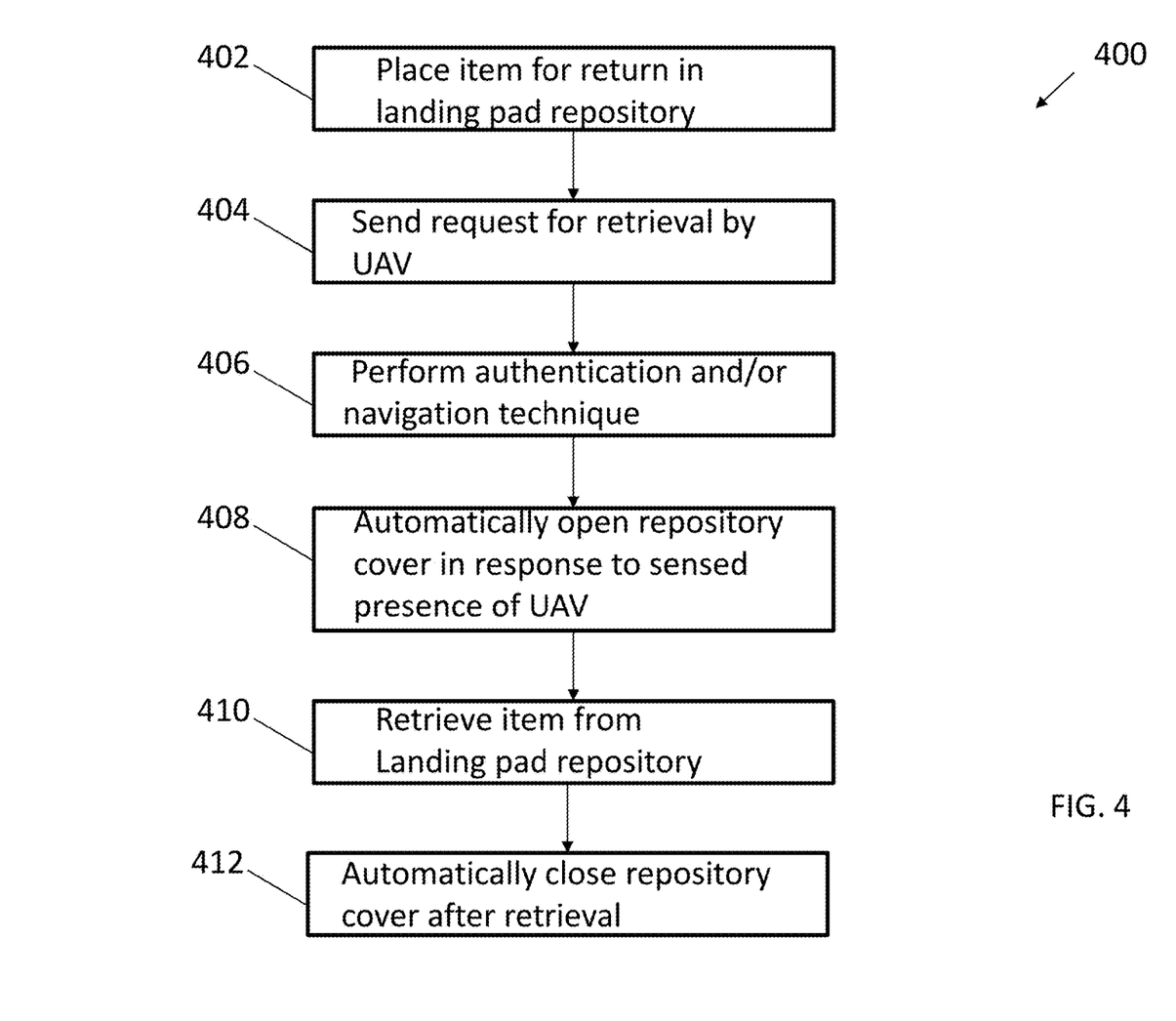
FIG. 4 is a flow diagram illustrating a method for retrieving a package from a landing pad receptacle by a UAV, in accordance with some embodiments.

As described in FIG. 4, the landing pad receptacle 100 is also constructed and arranged to permit retrieval of a package 17 in the receptacle 100, for example, in the event of damage to the package 17, or a customer's request that the package 17 be returned to the store or previous owner at where the package 17 was purchased. The method 400 illustrated at FIG. 4 may be performed by some or all of the elements of the environment illustrated at FIGS. 1 and 2. The package 17 may be authenticated by being weighed, scanned by an electronic device, visually scanned with a camera or other sensor, and so on. A result may be generated and sent to a customer's computer, such as a smartphone, electronic notebook, or laptop computer, which may include a message for the customer to accept terms and conditions, authorize delivery, and so on.

At block 402, package 17 is placed on the landing pad repository 100 for pickup by the UAV 22.

At block 404, a request is generated for the UAV 22 to retrieve the package 17. The request may be made by a user, for example, the user placing the package 17 in the landing pad receptacle 100. The request may be made from a computer device of the landing pad repository 100, or from a remote computer.

At block 406, at least one of the UAV 22 and the package 17 is authenticated. A validation device of the UAV 22, landing pad repository, remote computer, or a combination thereof may confirm the authenticity of the package for return by the unmanned vehicle. For example, the UAV 22 may execute a security technique that includes an exchange credentials with the landing pad receptacle 100. The receptacle 100 may include on-board navigation system for directing the UAV 22.

At block 408, the cover 204 is automatically opened in response to the landing pad repository 100 sensing the presence of the incoming UAV 22. This step may also be performed in method 300, which includes an empty repository 100 prior to entry of UAV 22 carrying the package 17.

At block 410, the package 17 is retrieved from the repository 100 by the UAV 22.

At block 412, the cover 204 is automatically positioned over the opening 203 to close the repository 100.

The foregoing method steps may include the storing of program code in a computer-readable storage device of the computer system through use of the processor. The program code, upon being executed by the processor, implements a method for delivering a package to a landing pad receptacle by a UAV and/or retrieving a package from a landing pad receptacle by a UAV. Thus, the present invention discloses a process for supporting, deploying and/or integrating computer infrastructure, integrating, hosting, maintaining, and deploying computer-readable code into one or more computer devices, wherein the code in combination with the computer device is capable of performing a method for delivering a package to a landing pad receptacle by a UAV and/or retrieving a package from a landing pad receptacle by a UAV.

A computer program product of the present invention comprises one or more computer readable hardware storage devices having computer readable program code stored therein, said program code containing instructions executable by one or more processors of a computer system to implement the methods of the present invention.

A computer system of the present invention comprises one or more processors, one or more memories, and one or more computer readable hardware storage devices, said one or more hardware storage devices containing program code executable by the one or more processors via the one or more memories to implement the methods of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein

What is claimed is:

1. A landing pad receptacle that receives and stores a package delivered by an unmanned vehicle, comprising:
   a housing;
   a storage compartment in the housing, including a plurality of sub-compartments each having a unique identification used by the unmanned vehicle to distinguish the sub-compartments from one another and each maintained independently of one another, wherein one sub-compartment of the plurality of sub-compartments has a unique cover specifically for the one sub-compartment and is secured in a different manner than other sub-compartments of the plurality of sub-compartments, and wherein the unique identification distinguishes a package in the one sub-compartment;
   a validation device that detects a presence of a package delivered by an unmanned vehicle in one or more of the sub-compartments of the storage compartment and authenticates the package distinguished by the unique identification for return by an unmanned vehicle; and
   an on-board navigation system for directing the unmanned vehicle to the landing pad, wherein the on-board navigation system includes a spatial or obstruction sensor or related object recognition device to guide the unmanned vehicle to the landing pad away from objects or impediments about the landing pad that pose a danger to an exchange of the package between the unmanned vehicle and the storage compartment.

2. The landing pad receptacle of claim 1, wherein the unmanned vehicle is an unmanned aerial vehicle (UAV).

3. The landing pad receptacle of claim 1, wherein the housing includes a theft-deterrent mesh material.

4. The landing pad receptacle of claim 1, wherein the validation device includes a weight sensor comprising:
   a platform on which the package is positioned; and
   a spring or hydraulic mechanism under the platform that detects a force applied to the platform, the force including the weight of the package.

5. The landing pad receptacle of claim 4, further comprising a cover at an opening to the housing, the cover automatically covering the opening to the housing when the weight sensor detects the weight of the package positioned on the platform of the weight sensor.

6. The landing pad receptacle of claim 1, further comprising a lock that automatically secures the package in the storage compartment in response to the validation device detecting the presence of the package.

7. The landing pad receptacle of claim 1, further comprising a plurality of light emitting diodes or fluorescent rim about the periphery of an opening to the housing for identifying the opening or for notifying a viewer of the presence of the package in the storage compartment.

8. The landing pad receptacle of claim 1, further comprising an on-board wireless interface for communicating with the unmanned vehicle.

9. The landing pad receptacle of claim 1, further comprising an alarm device for generating an alarm when an object is near the landing pad when the compartment includes the package.

10. The landing pad receptacle of claim 1, wherein the sub-compartments further comprise an Internet of Things (IoT) device.

11. The landing pad receptacle of claim 10, wherein the IoT device comprises a temperature controller for determining a temperature of the sub-compartments of the storage compartment.

12. The landing pad receptacle of claim 10, wherein the sub-compartments of the storage compartment comprises a first compartment that is temperature controlled at cold temperatures, and a second compartment that is temperature controlled at hot temperatures.

13. The landing pad receptacle of claim 1, wherein the storage compartment is configured for receiving at least a removable modular unit for accommodating a particular package.

14. The landing pad receptacle of claim 13, wherein the sub-compartments are each configured for being assigned and receiving a different package.

15. The landing pad receptacle of claim 1, wherein the validation device confirms the authenticity of the package for return by the unmanned vehicle.

16. The landing pad receptacle of claim 1, wherein the sub-compartment having the unique cover is constructed and arranged to receive a package including a prescription from the unmanned vehicle, and includes a unique security lock for allowing access to the one sub-compartment to an authorized user of the prescription.

17. A system for package delivery and receipt, comprising:
   a landing pad receptacle that receives and stores a package delivered by an unmanned vehicle, comprising plurality of sub-compartments each having a unique identification used by the unmanned vehicle to distinguish the sub-compartments from one another and each maintained independently of one another, wherein one sub-compartment is constructed and arranged to receive a package including a prescription from the unmanned vehicle, and includes a unique security lock for allowing access to the one sub-compartment to an authorized user of the prescription, wherein the one sub-compartment of the plurality of sub-compartments has a unique cover and is secured in a different manner than other sub-compartments of the plurality of sub-compartments, and wherein the unique identification distinguishes a package in the one sub-compartment; and
   a navigation system for directing the unmanned vehicle to the landing pad receptacle, including a spatial or obstruction sensor or related object recognition device to guide the unmanned vehicle to the landing pad away from objects or impediments about the landing pad that pose a danger to an exchange of the package between the unmanned vehicle and the sub-compartments.

18. The system of claim 17, wherein the landing pad receptacle comprises:
   a validation device that detects a presence of a package delivered by the unmanned vehicle in one or more of the sub-compartments of and authenticates a package for return by the unmanned vehicle.

* * * * *